L. EGER.
LOADING DEVICE.
APPLICATION FILED AUG. 27, 1919.
1,378,014.
Patented May 17, 1921.
2 SHEETS—SHEET 2.
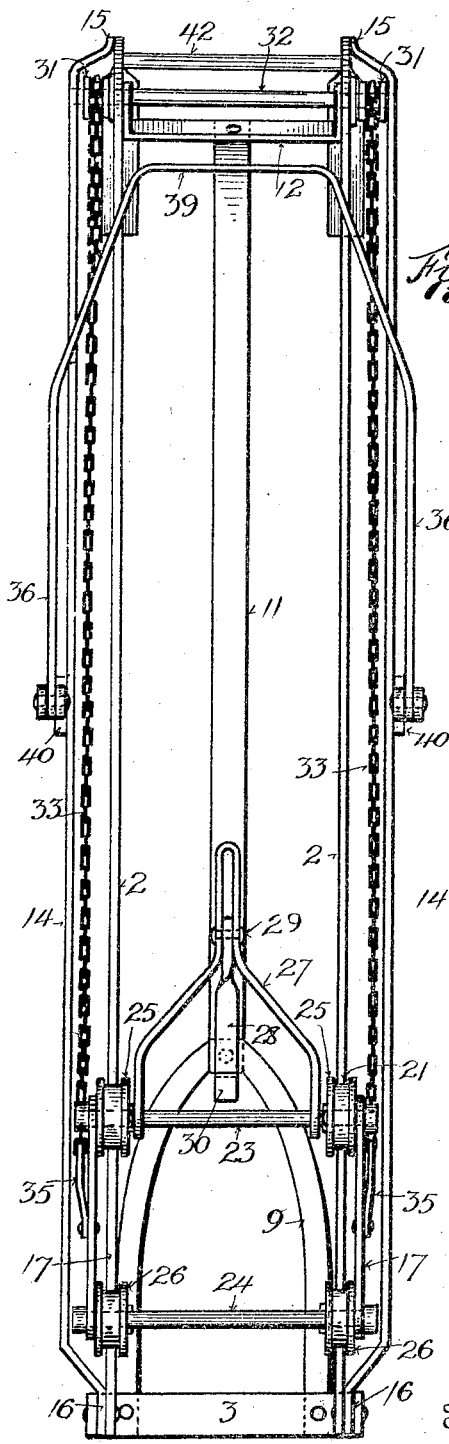
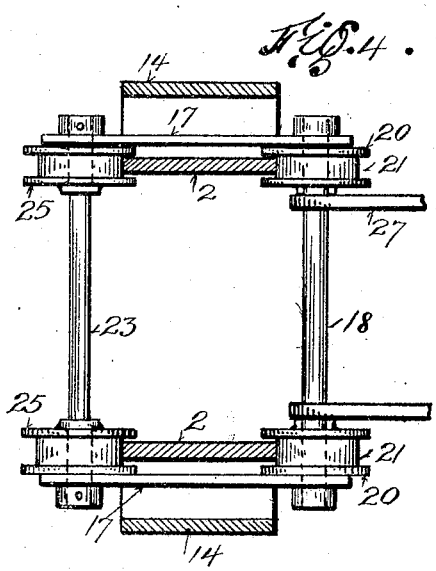
Louis Eger Inventor
By his Attorney
Charles G. Hensley

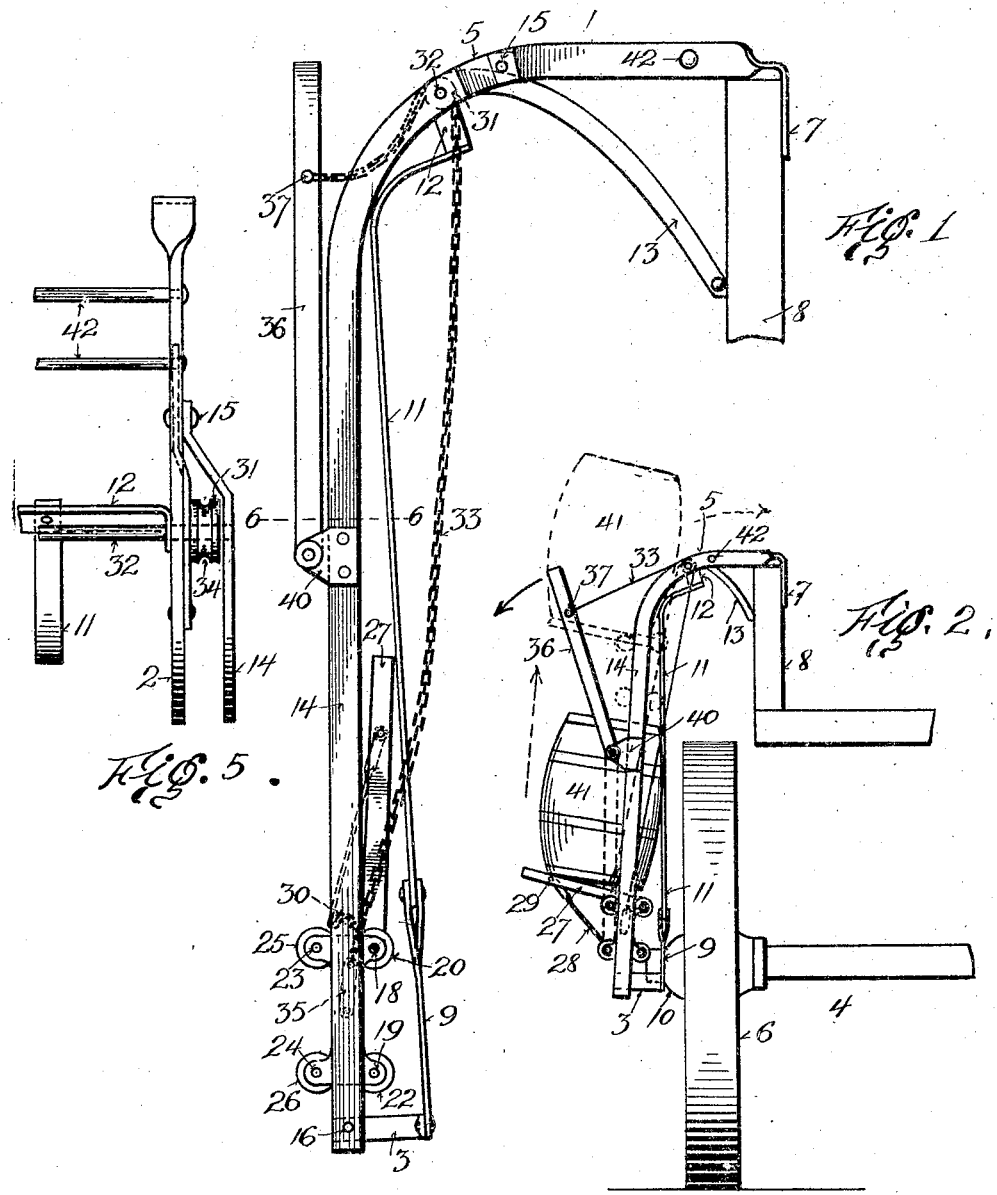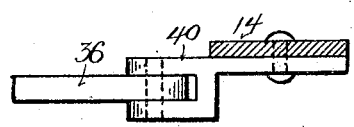

UNITED STATES PATENT OFFICE.

LOUIS EGER, OF BROOKLYN, NEW YORK, ASSIGNOR OF ONE-HALF TO JOHN L. MARTIN, OF BROOKLYN, NEW YORK.

LOADING DEVICE.

1,378,014.        Specification of Letters Patent.     Patented May 17, 1921.

Application filed August 27, 1919. Serial No. 320,200.

*To all whom it may concern:*

Be it known that I, LOUIS EGER, a citizen of the United States, and a resident of the borough of Brooklyn, city and State of New York, have invented certain new and useful Improvements in Loading Devices, of which the following is a specification.

My invention relates to a device for elevating boxes, barrels and other heavy objects and it is especially useful for loading wagons, trucks and similar conveyances. The present device forms a very convenient means for use by collectors of ashes or refuse in municipalities where it is necessary to raise barrels, cans, etc., up in order to discharge their contents into a cart or wagon, and in this use it is intended to facilitate the loading of the vehicle and to reduce the labor required.

The device comprises primarily a frame adapted to be attached to or hung on the vehicle body, of a movable carriage for elevating the barrel or other receptacle up to the vehicle, and of a lever arrangement for quickly raising the carriage. The present device is simple, compact, and it is readily attachable to and detachable from various forms of vehicles.

In the drawings forming part of this application,

Figure 1 is a side elevation of my device,

Fig. 2 is a similar view on a smaller scale, showing the same in position for use on a vehicle, Fig. 3 is a front elevation of the device, Fig. 4 is a horizontal sectional view showing the carriage and the manner in which it is guided by the track, Fig. 5 is a detail view of the upper part of the frame and one of the chain sheaves, and Fig. 6 is a sectional view taken on the line 6—6 of Fig. 1.

The frame 1 which supports the movable parts of the device is constructed as follows: There are parallel uprights or standards 2, connected at the bottom by a tie plate 3, and these standards are of sufficient length to reach from a point near the ground level to the upper part of the vehicle 4 which is to be loaded. At the top the standards are arched as shown at 5 to reach over the wheel 6 and to the body of the vehicle; and at their ends the standards have hooks 7 which engage the inner side of the vehicle body 8. There is a yoke 9 connected at its ends with the tie bar 3 and it is arched upwardly and it is adapted to straddle part of the hub 10 of the vehicle wheel and to rest against the enlarged part of the hub to maintain the lower part of the frame in position. This yoke 9 does not interfere with the turning of the wheel if the vehicle is moved from place to place while the loading device is in position.

There is a guide strap 11 connected with the top of the yoke 9 and extending upwardly to a tie rod 12 near the top of the frame. The strap 11 is intended to serve as a guide to retain the barrel or other object on the carriage, as will appear hereinafter. Near the arched top 5 of the frame there are fixed curved arms 13 which rest against the outer surface of the vehicle body 8 and together with the hooks 7 maintain the frame in position on the vehicle.

There are vertical bars 14 outside of and parallel with the standards 2 and these are connected with the standards at 15 and at the bottom at 16.

The carriage comprises in part a pair of side frames 17 having journaled therein an upper shaft 18 and a lower shaft 19 the former carrying the rollers 20 at each side having grooves 21 and adapted to roll in contact with and to be guided by the standards 2. There are grooved rollers 22 on the lower shaft 19 which also contact with the standards 2. The frame 17 has an upper shaft 23 and a lower shaft 24 in front of the standards and these carry grooved rollers 25, 26 respectively which also travel in contact with and are guided by the standards or tracks 2. The rollers 20, 22 travel in contact with the rear edges of the standards or tracks 2 whereas the rollers 25, 26 travel in contact with the front edges thereof. As the standards engage in the grooves 21 of the several rollers it will be apparent that the carriage is compelled to follow the standards and it cannot move laterally or forwardly or backwardly out of position.

There is a supporting bracket 27 for the articles or receptacles which are to be raised and this is pivoted on the shaft 18 so that it may be swung from a vertical or folded position to the position shown in Fig. 2. There is a brace arm 28 pivoted to the bracket 27 at 29 and the lower end of the brace is provided with a fork 30 which is adapted to engage the shaft 24 for the purpose of holding the bracket 27 in active position.

I have provided simple means for operating the carriage. At the arched portion of the standards there are sheaves 31 mounted on a shaft 32 which is journaled in the standards 2 and in the side bars 14, just outside the standards. Chains 33 engage in the grooves 34 of these sheaves and are attached at their lower ends to each side of the carriage by the pivoted arms 35. The chains extend over the sheaves and their opposite ends are secured to the operating lever 36 at 37. The operating lever is preferably bow shaped in order that it may pass over the carriage and whatever is being elevated on the latter and the top part 39 of the lever forms a handle to be grasped by the operator. The arms of the lever are pivoted at their lower ends to the brackets 40 mounted on the side bars 14, so that they do not interfere with the operation of the carriage.

Operation: The bracket 27 is adapted to be folded up into the position shown in Fig. 1 and the lever 36 may be folded up close to the frame, in order to make the device compact when not in use and if desired the device may be carried in the vehicle in this folded condition. When the device is to be set up for use the frame is tipped at an angle to place the hooks 7 to engage over the side 8 of the vehicle and then the frame is allowed to swing down until the yoke 9 rests against the hub 10 if the device is to be used near the wheel of the vehicle. The lever 36 is swung to its upper position and this allows the carriage to descend to the bottom of the standards or tracks to a position near the ground. The bracket 27 is swung outwardly and the brace 28 is placed on the shaft 24 so that the bracket 27 is held in a slightly inclined position as shown in Fig. 2. Any article to be elevated to the vehicle, for instance a barrel 41, is placed on the inclined bracket 27 of the carriage and it rests against the guide strap 11. The operator then grasps the operating lever 36 and swings it on its pivots outwardly and downwardly. This operation draws the chains 33 over the sheaves 31 and the carriage rises on the tracks 2 to the dotted line position shown in Fig. 2. In this operation the lever 36 swings over and around the carriage and barrel so that these parts do not interfere one with the other. When the lever is swung down close to the frame it may be released and the carriage will remain in its raised position because the line of pull of the chains on the lever 36 will be at such an angle relatively to the pivot of the lever 36 as to cause the lever to press against the frame.

When the carriage has been raised to the dotted line position of Fig. 2, the operator may simply tip the barrel over the rod 42 and allow it to drop into the vehicle. Or, if the device is used on an ash cart, the barrel may be simply tipped on the rod 42 and the contents allowed to fall into the vehicle. To lower the carriage the lever 36 is swung outwardly and upwardly. While the carriage is traveling up or down the barrel rests on the bracket 27 and it also rests against the guide strap 11 with which latter it has a sliding contact; and as the barrel is slightly inclined toward the guide strap it is not apt to tip away from the elevating device.

The present device is simple, compact and may be carried about with the vehicle and in fact it may be carried about in position for instant use.

Having described my invention, what I claim is:

1. A device of the class described, comprising a frame having guiding means, a carriage movable on said guiding means, and adapted to carry a barrel or other object, and a lever for raising said carriage arranged to move over and partially around said carriage and the object carried thereby, to permit said carriage to rise and fall.

2. A device of the class described comprising a frame adapted to be placed against a vehicle or other body for the purpose set forth and having guiding means, a carriage movable on said guiding means and adapted to carry a barrel or other object, sheaves on the upper portion of said frame, flexible members engaging over said sheaves and attached to said carriage, and a bow shaped lever adapted to operate said flexible members to raise said carriage and arranged to swing partially around said carriage and the object carried thereby.

3. A device of the class described, comprising a frame adapted to be placed against a vehicle or other body and including parallel tracks, a carriage movable on said tracks, bars arranged outside said tracks and connected thereto above and below the path of said carriage, flexible members for raising said carriage and a bow shaped lever pivoted to said bars and adapted to swing partly around said carriage and to operate said flexible members to move said carriage.

4. A device of the class described, comprising a frame having an arched top adapted to be hung on a vehicle, and provided with means for engaging the hub of the vehicle to maintain the frame in position, means movable on said frame for elevating an article to said vehicle and means for operating the elevating means.

5. A device of the class described, comprising a frame having an arched top provided with means for engaging a vehicle body whereby the frame will be supported on the latter, said frame having a yoke adapted to rest against the wheel hub of the vehicle to hold the lower portion of said frame without interfering with the operation of the wheel, a carriage movable up and down on said frame and provided with a foldable article support, a stationary guide against which an article on said carriage may rest, flexible members for raising said carriage and a lever for operating said flexible members, adapted to swing partially around said carriage.

Signed at the city of New York, county of and State of New York, this 13th day of August, 1919.

LOUIS EGER.